US006564296B2

United States Patent
Rechberger et al.

(10) Patent No.: US 6,564,296 B2
(45) Date of Patent: May 13, 2003

(54) COMMUNICATION DEVICE FOR RAPIDLY AND SIMULTANEOUSLY WRITING ONTO A PLURALITY OF DATA CARRIERS, AND DATA CARRIER FOR SUCH A COMMUNICATION DEVICE

(75) Inventors: Robert Rechberger, Gratwein (AT); Stefan Posch, Graz (AT)

(73) Assignee: Koninklijke Philips Electronics N.V., Eindhoven (NL)

(*) Notice: Subject to any disclaimer, the term of this patent is extended or adjusted under 35 U.S.C. 154(b) by 19 days.

(21) Appl. No.: 09/811,642

(22) Filed: Mar. 19, 2001

(65) Prior Publication Data

US 2001/0049775 A1 Dec. 6, 2001

(30) Foreign Application Priority Data

Mar. 21, 2000 (EP) .............................. 00890088

(51) Int. Cl.⁷ .............................................. G06F 12/00
(52) U.S. Cl. .................... 711/115; 711/170; 235/492
(58) Field of Search ................ 711/115, 170; 235/380, 382, 492

(56) References Cited

U.S. PATENT DOCUMENTS

| | | | | |
|---|---|---|---|---|
| 5,615,454 A | * | 4/1997 | Contarino | 24/116 A |
| 5,828,044 A | * | 10/1998 | Jun et al. | 235/380 |
| 5,923,884 A | * | 7/1999 | Peyret et al. | 235/382 |
| 6,070,797 A | * | 6/2000 | Vandenengel | 235/441 |
| 6,259,769 B1 | * | 7/2001 | Page et al. | 235/380 |
| 6,328,210 B1 | * | 12/2001 | Kim et al. | 235/380 |

* cited by examiner

Primary Examiner—Hiep T. Nguyen
(74) Attorney, Agent, or Firm—Daniel J. Piotrowski

(57) ABSTRACT

A data carrier (2) includes memory (16) adapted to store the information data (ID), and further includes first detection unit (28) adapted to detect first command data (CD1), and further includes initialization unit adapted to initialize, after detection of the first command data (CD1), the memory (16) for the storage of information data (ID), and further includes a second detection unit (29) adapted to detect second command data (CD2), and further includes write unit (32) adapted to write the information (ID) into the initialized memory (16) after detection of the second command data (CD2).

12 Claims, 4 Drawing Sheets

COMMUNICATION DEVICE FOR RAPIDLY AND SIMULTANEOUSLY WRITING ONTO A PLURALITY OF DATA CARRIERS, AND DATA CARRIER FOR SUCH A COMMUNICATION DEVICE

BACKGROUND OF THE INVENTION

Such a data carrier and such a circuit, such a communication device as well as such a method have been developed by the applicant and have been put onto the market, respectively, as a chip card and a read/write device for such a chip card under the designation MIFARE and are consequently known.

The known data carrier and the known communications device have the problem that writing information data into memory means of the data carrier is possible on in the course of bi-directional communication process. In the process of this bi-directional communication the communication device first performs an explicit selection of a data carrier, during which data is exchanged between the data carrier and the communication device. Subsequent to the selection of the data carrier. This starts a lengthy process between the data carrier and the communication device, in which process first of all an addressed memory location of the memory means is initialized for the storage of the information data. During the initialization a copy of the memory data stored in the addressed memory location is made and subsequently a read-after-write check of this copy is carried out. When the read-after-write check of this copy is successful the memory data stored in the addressed memory location is erased. After the erasure the information data transferred to the data carrier and received by the data carrier is loaded into the addressed memory location and this forms new memory data. A new read-after-write check of the memory data is preformed. When the new read-after-write check is successful the bi-directional communication between the data carrier and the communication device is terminated and the selection of the data carrier is canceled. This process provides maximal data security. However, the process less advantageous for an application in which information data should be written into memory means of plurality of data carriers substantially simultaneously during a communication process between the data carriers and the communication device, because in such applications it is often impossible to assure than an explicit selection of each data carrier and a time-consuming read-after-write check can be achieved for one hundred percent. This limitation is particularly important when a plurality of data carriers rapidly pass through a communication range of the communication device or when data carriers move past the communication device at the border of the communication range. In both cases a minimum dwell time required for a reliable bi-directional communication is difficult to achieve, as a result of which loss of data owing to a premature termination of a communication process is not unlikely.

SUMMARY OF THE INVENTION

It is an object of the invention to solve the aforementioned problems with a data carrier of the type defined in the opening part of claim 1, with a circuit of the type defined in the opening part of claim 4, with a communication device of the type defined in the opening part of claim 7, and with a method of the type defined in the opening part of claim 10, and to provide an improved data carrier, an improved circuit, an improved communication device and an improved method, so as to guarantee a reliable writing of information data into the memory means, without the risk of data loss, even for applications where in the process of communication between a communication device and at least one data carrier no explicit selection of the data carrier as during the bidirectiona communication and no time-consuming read-after-write check have been provided.

By the provision of the characteristic features in accordance with the invention it is achieved in an advantageous manner that a unidirectional communication from a communication device to a data carrier is possible, during which the information data can be written into the memory means of the data carrier communication very rapidly and without the risk of a data loss, without the explicit selection of the data carrier and without the time-consuming read-after-write check.

Moreover, the major advantage is obtained that even during a communication process with a plurality of data carriers the information data can be written into the memory means of each data carrier in a very rapid manner and, above all, simultaneously.

The provision of the characteristic features defined in claim 2, claim 5, claim 8 and claim 11, respectively, has the advantage that even during the unidirectional communication a passive selection is possible, during which passive selection each data carrier can decide autonomously on the basis of the memory means initialized in accordance with the group data whether the information data should be loaded into its memory means initialized in accordance with the group data.

The provision of the characteristic features defined in claim 3, claim 6, claim 9 and claim 12, respectively, has the advantage that an optimum utilization of the memory means available in the data carrier is possible. Furthermore, the advantage is obtained that a highly flexible structure of the group data is possible, which flexible structure enables a highly versatile use of the data carrier to be achieved, which is advantageous particularly in the case of varying requirements in different fields of use.

The above-mentioned as well as further aspects of the invention will become apparent from the embodiments described hereinafter by way of example and will be elucidated with reference to these examples.

BRIEF DESCRIPTION OF THE DRAWINGS

The invention will now be described in more detail with reference to the drawings, which show some embodiments given by way of example but to which the invention is not limited.

DETAILED DESCRIPTION OF THE PREFERRED EMBODIMENTS

Figure 1:
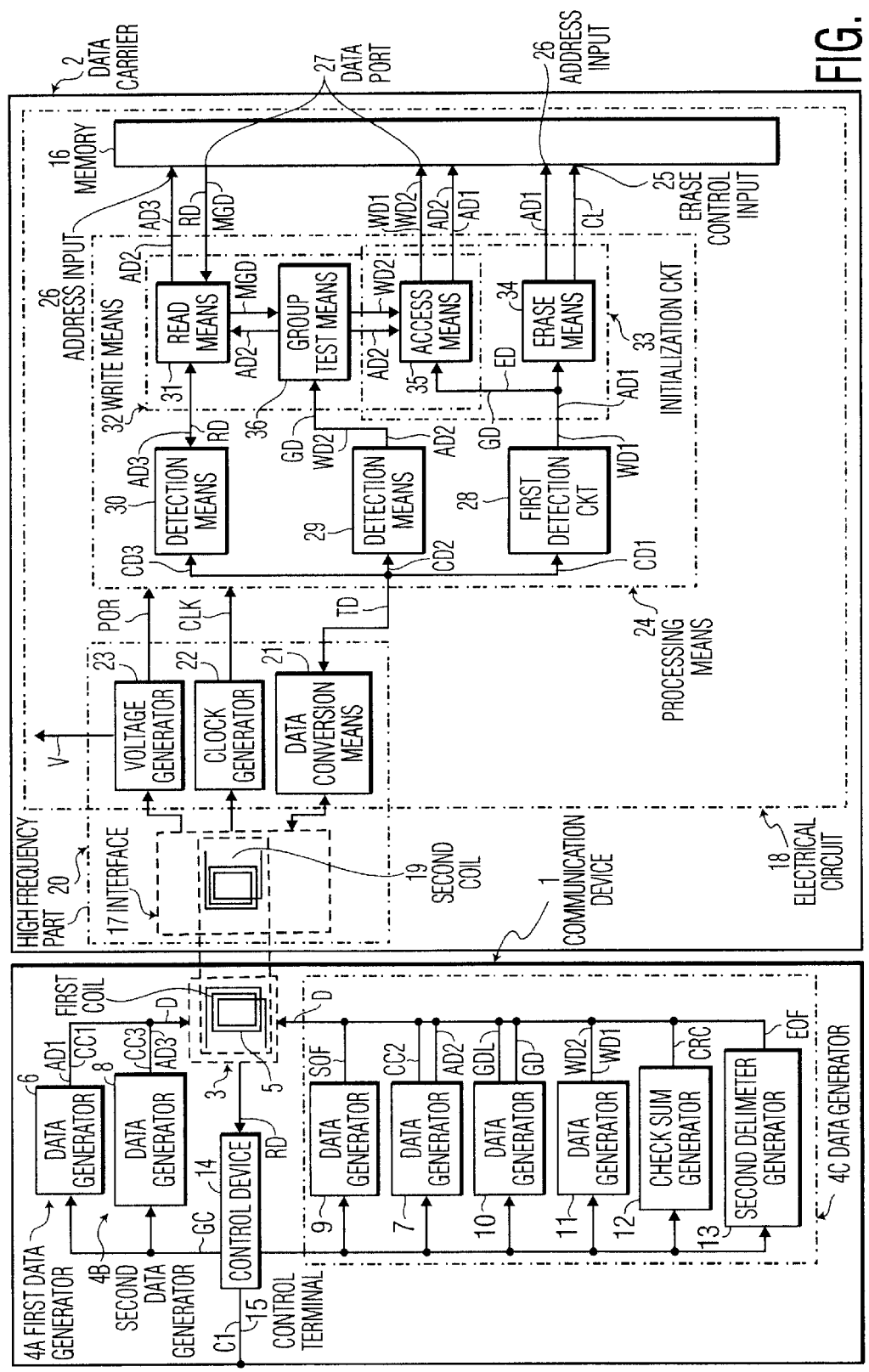
FIG. 1 is a block diagram which diagrammatically shows a record carrier part which is relevant in the present context as well as a circuit for the data carrier and a communication device for the transfer of first data to the data carrier in accordance with a first embodiment of the invention.

FIG. 1 shows a block diagram of a communication device 1 adapted to transfer data D to a data carrier 2. For the purpose of transferring the data D to the data carrier 2 the communication device 1 has a device interface 3. The device interface 3 is adapted to receive the data D from a data generator 4. The device interface 3 includes a high frequency generator, which is not shown in FIG. 1 and which is adapted to generate a high frequency carrier signal, which carrier signal can be applied to a modulation means, which is neither shown in FIG. 1 and which is adapted to effect an amplitude modulation of the carrier signal in accordance with the data D. The modulation means is further adapted to energize a first coil 5 of the device interface 3. By means of the first coil 5 the carrier signal can be transferred inductively to a second coil provided in the data carrier 2. The device interface 3 is further adapted to demodulate a load modulation of the carrier signal. For this purpose, the device interface 3 includes demodulation means, which are not shown in FIG. 1 and which are adapted to generate and supply read data RD to a control device 14.

The communication device 1 has a first command data generator 6 adapted to generate and supply a first command code CC1. The first command data generator 6 is further adapted to generate and supply the first address data AD1. The first command code CC1 and the first address data AD1 forms first command data CD1, which first command data CD1 can be transferred to the data carrier 2 and which first command data CD1 can be detected by means of the data carrier 2, as a result of which after detection of the first command data CD1 memory means 16 in the data carrier 2 can be initialized for the storage of information data ID in the data carrier 2 and after the initialization of the storage means 16 the information data ID can be written into the initialized memory means 16 in the data carrier 2. The first command data CD1 represent a write command.

The command device 1 further includes a command data generator 7 adapted to generate and supply a second command code CC2 and to generate and supply second address data AD2. The second command code CC2 and the second address data AD2 form the second command data CD2, which second command data CD2 can be transferred to the data carrier 2 and which second command data CD2 can be detected with the aid of the data carrier 2, as a result of which after detection of the second command data CD2 the information data ID can be written into the initialized memory means 16 in the data carrier 2. The second command data CD2 represent a transmit command.

The communication device 1 further includes a third command data generator 8 adapted to generate and supply a third command code CC3 and to generate and supply third address data AD3. The third command code CC3 and the third address data AD3 form third command data CD3, which third command data CD3 can be transferred to the data carrier 2 and which third command data CD3 can be detected by means of the data carrier 2, as a result of which information data ID can be read out of the memory means 16 in the data carrier 2 and said information data ID can be supplied in the form of data D from the data carrier 2 to the communication device 1 with the aid of the interface 3. After the demodulation the information data thus supplied to the communication device 1 form the read data RD.

The communication device 1 further includes a first delimiter data generator 9 adapted to generate and to supply SOF delimiter data SOF.

The communication device 1 further includes a group data generator 10 adapted to supply and generate group data length data GDL. The group data GD can be evaluated with the aid of the data carrier 2, as a result of which the memory means 16 in the data carrier 2 can be initialized in accordance with the group data GD and after detection of the second command data CD2 in the data carrier 2 the information data ID can be written into the memory means 16 initialized in accordance with the group data GD. The group data length data GDL can also be evaluated with the aid of the data carrier 2, as a result of which the memory means 16 in the data carrier 2 can be initialized in accordance with the group data GD with variable group data length and as a result of which after detection of the second command data CD2 in the data carrier 2 the information data ID can be written into the memory means 16 initialized in accordance with the group data GD with the variable group data length. The group data length data GDL comprise one byte, as a result of which the evaluation of the group data GD in a data carrier 2 adapted to evaluate only group data GD having a fixed group data length is very simple because the group data length data GDL can simply be filtered out and rejected.

Furthermore, it is to be noted that a group data generator 10 adapted to generate exclusively group data GD of a fixed group data length need not be adapted to generate and supply the group data length data GDL.

The communication device 1 further includes a write data generator 11 adapted to generate and supply first write data WD1 and to generate and supply second write data WD2.

The communication device 1 further includes 2 check sum generator 12 adapted to supply check sum data CRC.

The communication device 1 further includes a second delimiter data generator 13 adapted to generate and supply EOF delimiter data EOF.

The communication device 1 further includes a control device 14 adapted to receive and supply control information CI, which control information CI which can be applied to the control device 14 a control device 14 adapted to receive and supply control information CI, which control information CI which can be applied to the control device 14 and supplied by the communication device 1 via a control terminal 15 of the communication device 1. The control device 14 is adapted to generate generator control data GC in accordance with the control information CI. The generator control data GC can be applied from the control device to the first command data generator, the second command data generator 7, the third command data generator 8, the first delimiter data generator 9, the group data generator 10, the write data generator 11, the check sum generator 12 and the second delimiter data generator 13.

Figure 3:
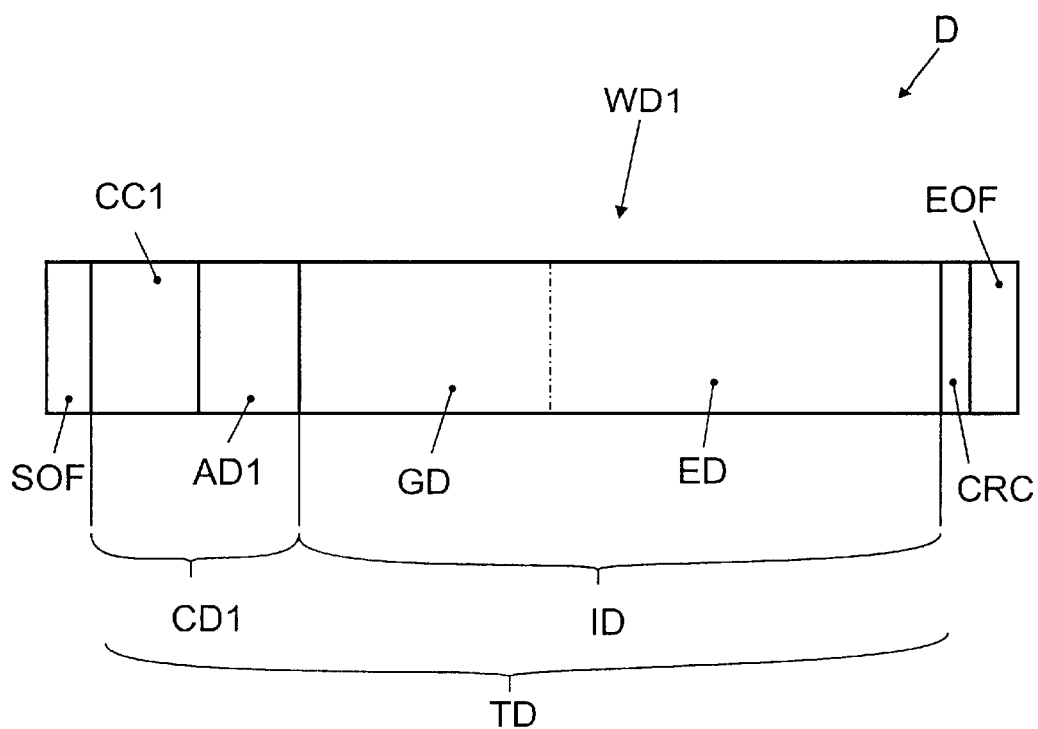
FIG. 3 shows symbolically a stream of first data that can be transferred from a communication device to a data carrier.

The generator control data GC make it possible control and time the cooperation of the first command data generator 6 with the first delimiter data generator 9, the write data generator 11, the check sum generator 12 and the second delimiter data generator 13, so as to enable a stream of first data D illustrated in FIG. 3 to be generated and to be applied to the device interface 3. During this timed cooperation the means 9, 11, 12, 13 form a first data generator 4A adapted to generate the stream of first data D in accordance with the standard ISO15693, in the present case adapted to the optional commands defined in the standard.

The stream of first data D begins with the SOF delimiter data SOF and ends with the EOF delimiter data EOF. Between the SOF delimiter data SOF and the EOF delimiter data EOF, which form a data frame, the stream comprises the first data D, useful data TD. Adjoining the SOF delimiter data SOF the first data D include first command data CD1 which start with the first command code CC1 and which end with the first address data AD1. Adjoining the first command data CD1 the stream of first data D includes information data ID, which information data ID are formed by the first write data WD1. The stream of first data D further includes the check sum data CRC between the information data ID and the EOF delimiter data EOF.

Figure 4:
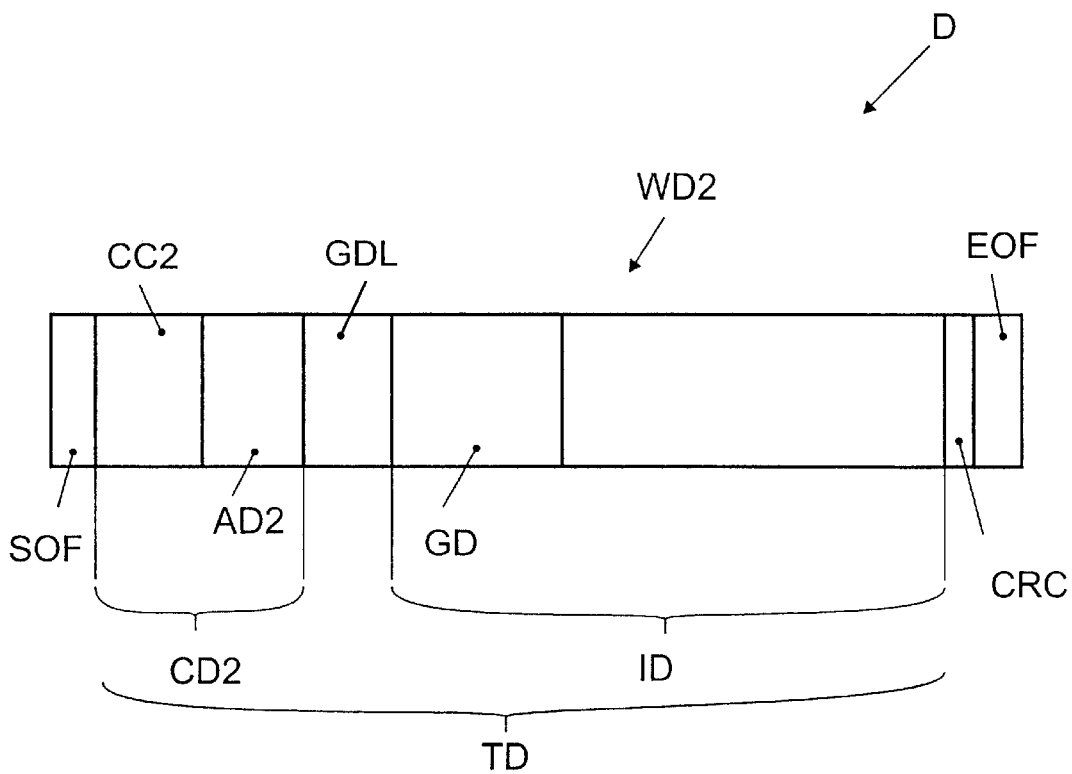
FIG. 4, in a manner similar to FIG. 3, shows a stream of second data.

The generator control data GC further make it possible to control and time the cooperation of the first delimiter data generator 9, the second command data generator 7, the group data generator 10, the write data generator 11, the check sum generator 12 and the second delimiter data generator 13, so as to enable a stream of second data D illustrated in FIG. 4 to be generated and to be applied to the device interface 3. During this timed cooperation the means 9, 7, 10, 11, 12 and 13 form a second data generator 4B adapted to generate the stream of second data D in accordance with the standard ISO15693, in the present case adapted to the customer-specific commands defined in the standard, which commands may have an arbitrary length.

The stream of second data D begins with the SOF delimiter data SOF and ends with the EOF delimiter data EOF. The useful data TD are again accommodated between the SOF delimiter data SOF and the EOF delimiter data EOF, which useful data TD start with the first command data CD, and following the second command data CD2 the group data length data GDL and following the group data length data GDL the information data ID. The second command data CD2 start with the second command code CC2 and end with the second address data AD2. In the present case, the information data ID start with the group data GD and end with the second write data WD2.

Figure 5:
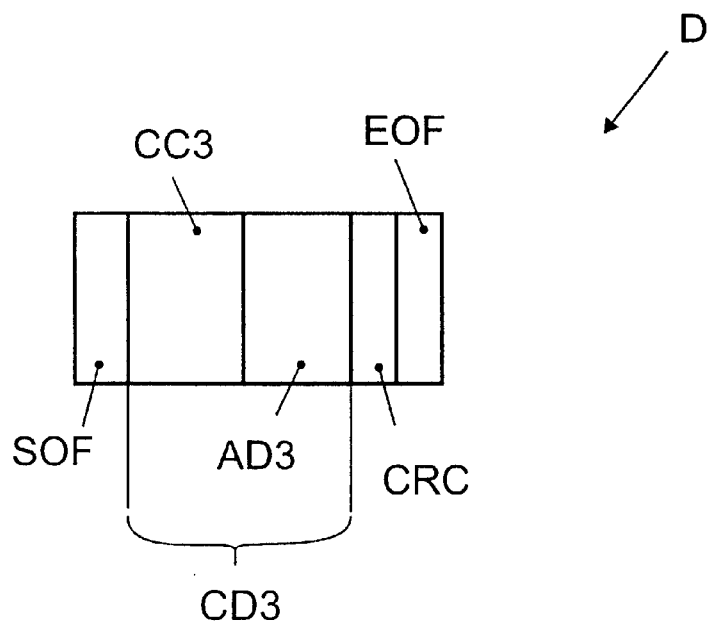
FIG. 5, in a manner similar to FIG. 3, shows a stream of third data.

The generator control data GC further make it possible control and time the cooperation between the first delimiter data generator 9, the third command data generator 8, the check sum generator 12 and the second delimiter data generator 13, so as to enable a stream of third data D illustrated in FIG. 5 to be generated and to be applied to the device interface 3. During this timed cooperation the means 9, 8, 12 and 13 form a third data generator 4C adapted to generate the stream of second data D in accordance with the standard ISO15693, in the present case adapted to the optional commands defined in the standard.

The stream of first data D begins with the SOF delimiter data SOF and ends with the EOF delimiter data EOF. The useful data TD are again accommodated between the SOF delimiter data SOF and the EOF delimiter data EOF, which useful data TD are formed by the third command data CD3 in the present case. The third command data CD3 start with the third command code CC3 and end with the third address data AD3.

The data carrier 2 shown in FIG. 1 is adapted to receive the data D supplied by the communication device 1. For this purpose, the data carrier 2 has an interface 17 and an electrical circuit 18, which circuit 18 includes circuit parts of the interface 17.

The interface 17 has a second coil 19. The second coil 19 is designed in such a manner that after entry of the data carrier 2 into a communication range of the operative communication device 1 it forms an inductive coupling with the first coil 5 of the communication device 1 and thus receives the carrier signal generated by means of the communication device 1. The second coil 19 forms part of a high-frequency part 20 of the interface 17, which high-frequency part 20 is adapted to supply the received carrier signal to data conversion means 21 of the interface 17 and to an operating clock generator 22 of the interface 17 as well as to an operating voltage generator 23 of the interface 17. The data conversion means 21, the operating clock generator 22 and the operating voltage generator 23 form the circuit parts of the interface 17. The operating voltage generator 23 is adapted to generate and supply an operating voltage V and a power-on reset signal POR. The operating voltage V serves to power the circuit 18. The power-on reset signal POR serves to start a data processing means 24 of the data carrier 2. The operating clock generator 22 is adapted to generate and to supply an operating clock signal CLK, which operating clock signal CLK serves as a time base for the data conversion means 24.

The data conversion means 21 are adapted to receive the carrier signal from the high-frequency part 20 of the interface 17. The data conversion means 21 are further adapted to demodulate the carrier signal, to detect useful data TD delimited by SOF delimiter data SOF and EOF delimiter data EOF in the stream of received data and to extract the useful data TD and to supply these useful data TD to the data processing means 24. The data conversion means 21 are adapted to receive useful data TD in the case that data are received. Furthermore, the data conversion means 21 are adapted to receive useful data TD from the data processing means 24. In this case, the data conversion means 21 are adapted to provide said useful data TD with SOF delimiter data SOF, with a check sum CAC and with EOF delimiter data EOF, i.e. to generate a stream of fourth data D, which stream of fourth data D can be applied to the communication device with the aid of a load modulation of the carrier signal.

The memory means 16 of the data carrier 2 are adapted to store the information data ID. In the present case, the memory means 16 take the form of a $E^2$ PROM, which $E^2$ PROM has an erase control input 25 for receiving an erase control signal CL. The memory means 16 further have address inputs 26 for receiving the first address data AD1, the second address data AD2, and the third address data AD3. The memory means 16 further have bi-directional data ports 27 via which read data RB can be output and via which the first write data WD1 and the second write data WD2 can be input.

It is to be noted that the memory means 16 also have access control ports, which are not shown in FIG. 1. With the aid of these acccess control ports it is possible to control a write or read access when the first write data WD1 and the second write data WD2 are received or the read data RD are supplied. These control ports will not be described in any further detail because they are not relevant to the invention.

Figure 6:
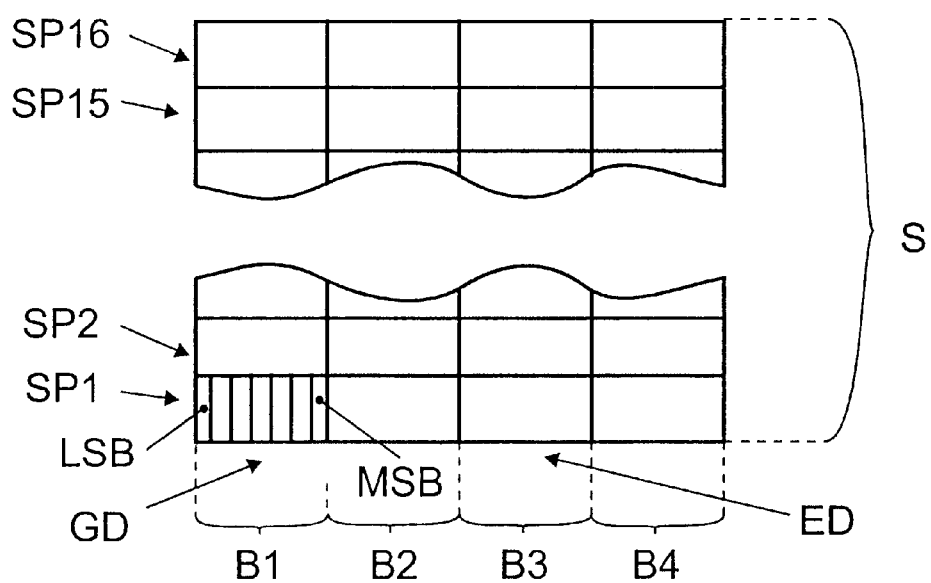
FIG. 6 diagrammatically shows memory locations of a data carrier in accordance with the invention.

FIG. 6 shows a plurality of memory locations 16, which memory locations are referred to as blocks. In the present case, the memory means 16 have sixteen memory locations S, of which memory locations FIG. 6 shows only a first memory location SP1, a second memory location SP2, a fifteenth memory location SP15 and a sixteenth memory location SP16. Each memory location has four bytes, namely a first byte B1, a second byte B2, a third byte B3 and a fourth byte B4. The four bytes in each memory location represent the first write data WD1 or the second write data WD2 or the read data RD, depending on the memory access mode.

The data processing means 24 of the data carrier 2 shown in FIG. 1 take the form of a microprocessor by means of which program steps stored in read-only memory means not shown in FIG. 1 can be carried out. The data processing means 24 have detection means 28, second detection means 29 and third detection means 30, realized with the aid of this microprocessor by the execution of program steps. The first detection means 28 are adapted to detect the first command data CD1 included in the useful data TD, i.e. to detect the write command. The second detection means 29 are adapted to detect the second command data CD2 included in the useful data TD, i.e. to detect the transmit command. The third detection means 30 are adapted to detect the command data CD3 included in the useful data TD, i.e. to detect the read command.

After a detection of the first command data CD1 or the second command data CD2 or the third command data CD3, memory access means can be activated with the aid of the first detection means 28, or the second detection means 29 or the third detection means 30, with the aid of which memory access means the memory means 16 can be accessed for a write operation or a read operation or an erase operation. The memory access means include read means, write means 32 and initialization means 33.

The read means 31 are adapted to carry out the read access to the memory means 16. For this purpose, the third address data AD3 can be supplied to the read means 31 the aid of the third detection means 30. The third address data AD3 can be applied to the memory means 16 in the course of the write access, after which the memory means 16 can supply the read data RD to the read means 31. The read means 31 are further adapted to receive said read data RD and supply them to the third detection means 30. The read data RD thus transferred to the third detection means 30 can be supplied to the interface 17 as useful data TD to be transmitted and can be transferred to the communication device 1 with the aid of the interface 17. However, the read data RD transferred to the third detection means 30 may also be used for further processing in the data processing means 24 may also be used for further processing in the data processing means 24, as is possible with the aid of the third detection means 30 after detection of a read command. After detection of the write command the initialization means can be activated with the aid of the first detection means 28. After the detection of the first command data CD1 the initialization means 33 are adapted to initialize the memory means 16 for the storage of the information data ID. For this purpose, the initialization means 33 include erase means 34 and write access means 35.

The erase means 34 are adapted to receive the first address data AD1 from the first detection means 28. The erase means are further adapted to perform the erase access to the memory means 16, during which erase access the erase means 34 can supply the first address data AD1 to the address inputs 26 of the memory means 16. Furthermore, the erase means 34 can supply the erase signal CL to the erase terminal 25 of the memory means 16. Subsequently, a memory location addressed with the aid of the address data AD1 can be erased in the memory means 16. During this erasure all the bits in the addressed memory location are programmed either with a logic one or with a logic zero depending on the type of $E^2$ PROM used.

After initialization of the memory means 16 the write access means 35 are adapted to write the information data ID into the initialized memory means 16. For this purpose, the write access means 35 are adapted to receive the first address data AD1 and the first write data WD1 from the first detection means 28. The write access means 35 are further adapted to supply the first address data AD1 to the address terminals 26 of the memory means 16. Moreover, the write access means 35 are adapted to supply the first write data WD1 to the data ports 27 of the memory means 16. Thus, in the course of this write access the first write data WD1 can be stored in a memory location of the memory means 16 addressed with the aid of the first address data AD1. In the present context, the first write data WD1 may also be formed by group data GD and by dummy data ED. The group data GD and the dummy data ED then form the information data ID, as is shown in FIG. 3. Accordingly, only a first portion of the memory location of the memory means 16 addressed with the aid of the first address data AD1 can be loaded with group data GD, a second portion of the addressed memory location not being inscribed as a result of the dummy data ED. After this write access the second portion of the addressed memory location remains in its initialized state. Accordingly, the initialization means 33 are adapted to initialize the memory means 16 in accordance with the group data GD included in the group data GD after detection of the first command data CD1.

It is to be noted that, in order to ensure a successful write access to the memory means 16 in accordance with the first address data AD1 and the first write data WD1, an internal read-after-write check may be performed. During this read-after-write check the third detection means 30 can be activated with the aid of the first detection means 28 after the write access. During this activation the first address data AD1 form the third address data AD3, so that during a read access with the aid of the read means 31 the write data WD previously written into the memory means 16 can be read as read data RD. The read data RD thus read can then be supplied from the third detection means 30 to the first detection means 28, where they can be compared with the write data originally written into the memory means 16.

It is to be noted also that during a write access in accordance with the write command a successful completion of this write access may be signaled to the communication device 1 by means of acknowledgement data from the data carrier 2.

After detection of the transmit command the write means 32 are adapted to write the information data ID shown in FIG. 4 into the initialized memory means 16. For this purpose, the write means 32 include the read means 31, the group data test means 36 and the write means 35. In the present case, the group test means 36 are adapted to evaluate the group data GD having a fixed group data length. Thus, the second detection means 29 are adapted to extract group data length data GDL included in the useful data TD, as a result of which only the group data GD can be supplied to the group data test means 36.

The group data test means 36 are adapted to receive the second address data AD2, the group data GD and the second write data WD2. The group data test means 36 are further adapted to supply the second address data AD2 to the read means 31. After reception of the second address data AD2 from the group data test means 36 the read means 31 are adapted to perform a read access to the memory means 16 in accordance with the second address data AD2. During this read access group data stored in the memory means 16 in the memory location addressed with the aid of the second address data AD2 can be read and can be supplied from the read means 31 to the group data test means 36. After reception of the stored group data MGD the group data test means 36 are adapted to compare the group data GD with the stored group data MGD. If the group data GD and the stored group data MGD match the group data test means 26 are adapted to supply the second address data AD2 and the second write data WD2 to the write access means 35. After reception of the second address data AD2 and the second write data WD2 the write access means 35 are adapted to write the second write data WD2 included in the information data ID into the memory location addressed with the aid of the second address data AD2, in the memory means 16 initialized in accordance with the group data GD.

If the group data GD and the stored group data MGD do not match the group data test means 36 are adapted to interrupt writing of the information data ID into the initialized memory means 16.

It is to be noted that in a situation in which it is guaranteed that a distinction between different data carriers 2 on the basis of different group data GD is not necessary, the group data test means 36 may be dispensed with. In said situation the second detection means 29 are adapted to supply the second address data AD2 and the second write data WD2 directly to the write access means 35. This has the advantage that a transmit command can be executed very rapidly.

Hereinafter, the operation of the data carrier 2 and the communication device 1 is explained with reference to a first example of use of the data carrier 2 in accordance with the first embodiment of the invention shown in FIG. 1 and of the communication device 1 in accordance with the first embodiment of the invention shown in FIG. 1.

In this first example of use it is assumed that the communication device 1 and the data carrier 2 are used in a public transport company, in the present case a subway line. In the present example at least one turnstile is installed in an entrance area of the subway line in order to guarantee a steady and orderly entry of passengers. At least one interface 3 or a part of the interface 3, namely the first coil 5 of the communication device 1, is arranged in the area of this turnstile. In accordance with the definitions of the standard ISO15693 both the communication device 1 and the data carrier 2 are adapted to communicate over a typical distance of 40 cm to 1 m between the communication device 1 and the data carrier 2. As a result, a passenger may carry the data carrier 2 in his wallet and the data carrier need not be brought explicitly in the direct proximity of the interface 3 or the first coil 5 of the communication device 1. For safety reasons the subway line normally has no barriers in the exit area, so as to allow a multitude of customers to pass through the exit area at the same time and as rapidly as possible. In this exit area a plurality of first coils 5 of a communication device 1 are arranged in order to achieve that the whole exit area is covered by the communication range of the communication device 1.

The subway operator uses the data carrier 2 in accordance with the invention for the purpose of collecting statistical data as regards the time that passengers stay in the subway and as regards the volume of traffic at different subway stations. For this purpose, an entry location and an entry time are recorded on a data carrier 2 carried by each passenger during passage through the entrance gate. Subsequently, the memory means 16 are initialized to store an exit time and an exit location, so as to guarantee a reliable storage of the exit time and the exit location even when a multitude of passengers passes rapidly through the exit area.

During the recording of the entry location and the entry time the control device 14 in the communication device 1 activates the first data generator 4 and a write command is generated. This write command is supplied to the interface of the communication device 1 as a stream of first data D and is transferred by the latter as a modulated carrier signal to the interface 17 of a single data carrier 2 located within the communication range of the communication device 1. The first stream of data D is received by the interface 17 of the data carrier 2, after which the data conversion means 21 supply the useful data TD, which include the command data CD1 and the information data ID, to the data processing means 24 of the data carrier 2. The information data ID include the entry location and the entry time. In the data processing means 24 the first command data CD1 are detected by the first detection means 28. After detection of the first command data CD1 the memory means 16 are initialized with the aid of the initialization means 33 in order to store the information data ID. After the initialization of the memory means the information data ID are stored in the memory means 16 with the aid of the write means 35 as first write data WD1 during a write access. In the present case it is assumed that the first address data AD1 relate to the second memory location SP2 shown in FIG. 6, so that the first write data WD1 are stored in the second memory location SP2. Subsequently, a read-after-write check of the stored first write data WD1 is started in the communication device 1 shown in FIG. 1. The third data generator 4 is then activated and a read command is generated, which is applied to the interface 3 as a stream of third data D. The interface 3 transfers this stream of third data D to the interface 17 of the data carrier 2 and the interface 17 supplies it to the data processing means 24 in the form of useful data TD. In the data processing means 24 the third command data CD3 included in the useful data TD are detected by the third detection means 30, after which the third detection means 30 supply the third address data AD3 to the read means 31. In the present case, the third address data AD3 are identical to the first address data AD1. The read means 31 now access the memory means 16 during a write access, the information data stored at the address AD3 being read from the memory means 16 and being supplied to the third detection means 30. The third detection means 30 again generate useful data TD, which are transferred from the interface 17 of the data carrier 2 to the interface 3 of the communication device 1 in the form of a stream of fourth data. The read data RD supplied to the control device 14 by the interface 3 serve to decide whether the prior recording of the first write data WD1 has been successful or not successful in the course of the processing of the write command in the data carrier 2.

During a new generation of a write command inn the communication device 1 a new stream of first data D is generated, which first data D include information data ID in accordance with the stream of first data D shown in FIG. 3. Said information data ID start with group data GD and end with dummy data ED. As already described, the stream of first data D is transferred to the data carrier 2, after which the interface 17 supplies useful data TD to the data processing means 24. The first detection means 28 again detect the first command data CD1 and supply the first address data AD1 to the erase means 34 and the write means 35. The first detection means 28 further supply the group data GD forming the first write data WD1 and the dummy data ED to the write means 35. The erase means 34 now erase a memory location of the memory means 16, addressed with the aid of the address data AD1, in an erase access. In the present case the first address data AD1 relate to the first memory location SP1, which first memory location SP1 is now erased. Subsequently, the write data WD1 are stored in the first memory location SP1, starting with the least significant bit LSB of the first memory locatin SP1 and ending with the most significant bit MSB and beginning with the first bit B1 of the first memory location SP1. The residual bits of the four bytes of the first memory location SP1 are loaded with dummy data ED. Thus, the memory means 16 are initialized in accordance with the group data GD included in the stream of first data D. It is to be noted that the communication device 1 may also start a read-after-write check subsequently to said write command.

When the subway is left, i.e. during the passage of the exit area, the exit time and the exit location should be written into the memory means 16, which have been initialized in accordance with the group data GD, for all the data carriers 2 situated within the communication range of the communication device 1. For this purpose, the communication device 1 generates and transmits the transmit command essentially continuously. Each data carrier 2 which carried along during passage of the exit area now receives the stream of second data D with the aid of the interface 17 after entry of the data carrier 2 into the communication range of the communication device 1. The data conversion means 21 then extract the useful data TD from the stream of second data D shown in FIG. 4 and supply the useful data TD to the data processing means 24. In the data processing means 24 the second command data CD2 are now detected with the aid of the second detection means 29. Subsequently, the second address data AD2, the group data GD and the second write data WD2 are supplied to the group data test means 36. In response thereto, the group data test means 36 cause the read means 31 to read the memory location of the memory means 16, addressed with the aid of the second address data AD2, during a read access. In the present case, the second address data AD2 refer to the first memory location SP1 of the memory means 16. The read data RD thus obtained include group data MGD and are supplied to the group data test means 36. The group data test means 36 subsequently check whether the group data GD match with the stored group data MGD. If the group data GD and the stored group data MGD match a write access to the first memory location SP1 of the memory means 16 is effected with the aid of the write means 35, during which write access the write data WD2 are written into the memory location of the memory means 16 addressed with the aid of the second address data AD2. In this respect, it is to be noted that it is advantageous to write information data ID consisting of group data GD and second write data WD2, as a result of which a time-consuming masking of the group data GD with zero data, i.e. data which do not alter portion of the addressed memory location which contains the stored group data MGD, can be avoided. After detection of the second command data CD2 the information data ID are thus written into the memory means 16 initialized in accordance with the group data GD.

In the case that the second address data AD2 do not relate to the first memory location SP1 of the memory means 16 the group data will not match the stored group data MGD represented by the read data RD and the second write data WD2 will not be written into the memory means 16.

Writing the information data ID into the initialized memory means 16 after detection of the second command data CD2 has the advantage that by means of the transmit command all the data carriers 2 within the communication range of the communication device 1 are actuated and thereby allow a simultaneous and rapid passage of the passengers through an exit area of the subway line.

Furthermore, writing the information data ID into the memory means 16, which have been initialized in accordance with the group data GD, after detection of the second command data CD2 has the advantage that in a data carrier 2 a received and detected transmit command is executed only if the stored group data MGD addressed with the aid of the second address data AD2 and the group data GD transferred in the transmit command match. This allows a passive selection of a data carrier 2 or a group of data carriers 2 in accordance with the group data GD because this selection of the data carrier 2 does not entail a bi-directional communication between the communication device 1 and the data carrier 2.

Figure 2:
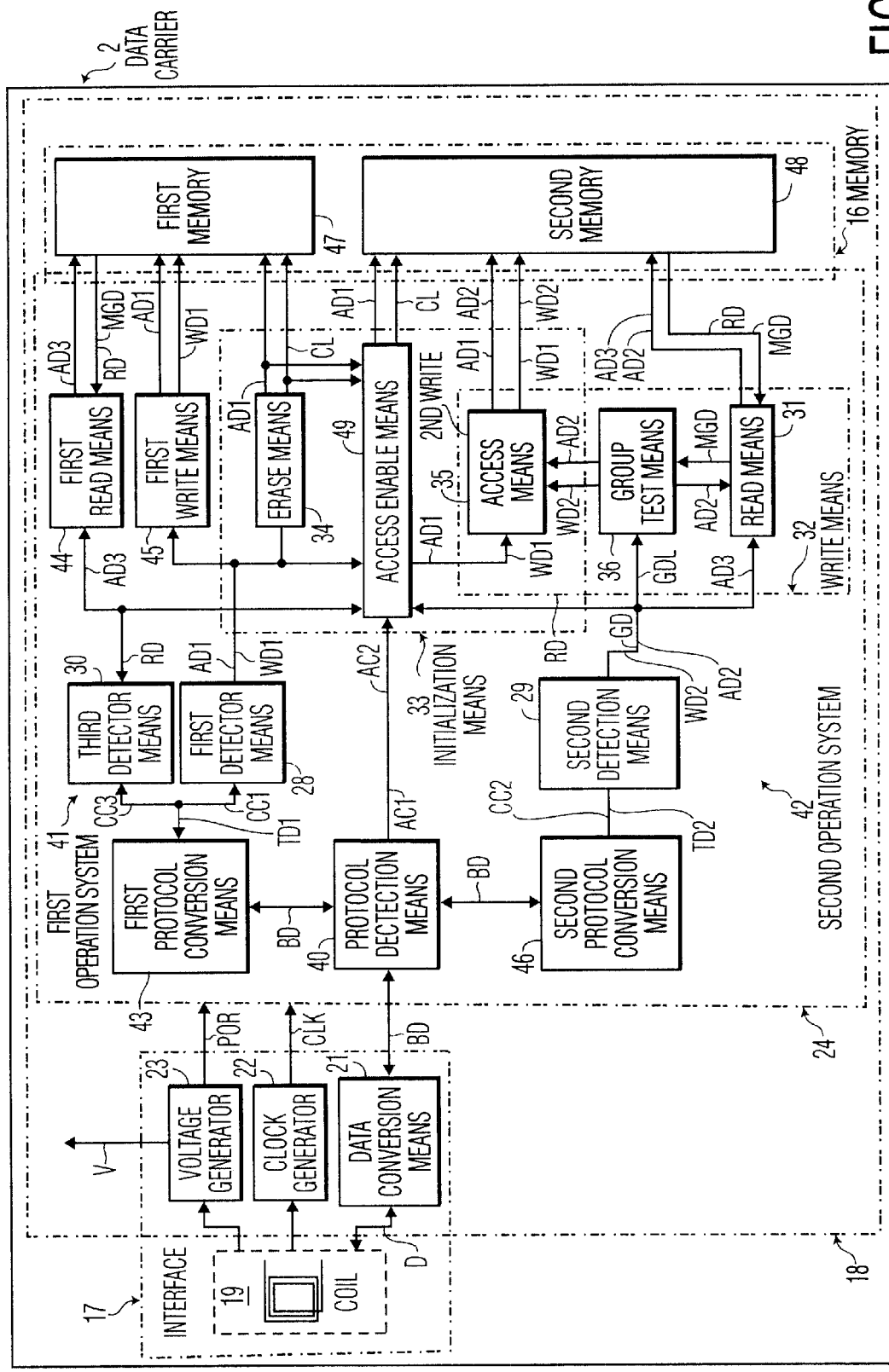
FIG. 2, in a manner similar to FIG. 1, shows a data carrier and a circuit for the data carrier in accordance with a second embodiment of the invention.

FIG. 2 shows a data carrier 2 which, similarly to the data carrier 2 shown in FIG. 2, is adapted to receive the transmit command from the communication device 1 shown in FIG. 1. As a result, the data carrier 2 is adapted to receive the transmit command at a long range, namely, as already stated, typically 40 cm to 1 m in accordance with the specifications defined in the standard ISO15693. However, the data carrier 2 shown in FIG. 2 is also adapted to communicate with a secondary communication device, not shown in FIG. 2, namely at short range of typically around approximately 10 cm in accordance with the specifications defined in the standard ISO14443.

In contradistinction to the data carrier 2 shown in FIG. 1, the data conversion means 21 of the interface 17 are only adapted to convert the data D conveyed to the data carrier 2 with the aid of the carrier signal into a bit stream BD of logic ones and logic zeros, which bit stream BD can be supplied to protocol detection means 40 by the data conversion means 21. The protocol detection means 40 are adapted to detect a first communication protocol in accordance with the standard ISO14443 and to detect a second communication protocol in accordance with the standard ISO15693. After detection of the first communication protocol with the aid of the communication protocol detection means 40 the protocol detection means 40 can start a first operating system 41. After detection of the second communication protocol with the aid of the protocol detection means 40 the protocol detection means 40 can start a second operating system 42. Furthermore, after detection of the first communication protocol the protocol detection means 40 are adapted to generate and to supply a first access control signal AC1. Moreover, after detection of the second communication protocol the protocol detection means 40 are adapted to generate and to supply a second access control signal AC2.

The first operating system 41 has first protocol conversion means 43, third detection means 30, first detection means 28, first read means 44, first write access means 45 and erase means 34. The first operating system is adapted to process a write command and a read command with the aid of the means 43, 30, 28, 44, 45 and 34. When the first operating system 41 is started the protocol detection means 40 can supply the bit stream BD to the first protocol conversion means 43. The first protocol conversion means 43 are adapted to convert the bit stream BD into useful data TD1 in accordance with the invention the standard ISO14443. The first protocol conversion means 43 are further adapted to supply said first useful data TD1 to the third detection means 30 which, similarly to those of the data carrier 2 shown in FIG. 1, are adapted to detect a read command, but which read command in the present case can be generated by the secondary communication device. The first protocol conversion means 43 adapted to receive first useful data TD1 supplied by the third detection means 30 during processing of the read command. The protocol conversion means 43 can convert said received useful data TD1 into a bit stream BD in accordance with the standard ISO14443, which bit stream can be applied to the conversion means 21 of the interface 17, from which it can be supplied to the secondary communication device as a stream of fourth data D, in a manner similar to that in the data carrier 2 shown in FIG. 1, but in this case in accordance with the standard ISO14443 in the course of a load modulation. The first protocol conversion means 43 are further adapted to supply the first useful data TD1 to the first detection means 28, which first detection means 28, similarly to those in the data carrier 2 shown in FIG. 1, are adapted to detect a write command, which write command can be generated by the secondary communication device in the present case.

The second operating system 42 has second protocol conversion means 46, second detection means 29 and write means 32. With the aid of these means 46, 29 and 32 the second operating system 42 is adapted to process a transmit command. When the second operating system 42 is started the protocol detection means 40 can supply the bit stream BD to the second protocol conversion means 46. The second protocol conversion means 46 are adapted to receive the bit stream BD and to convert the bit stream BD in accordance with the standard ISO15693 and to supply second useful data TD2 to the second detection means 29, which second detection means 29, similarly to those in the data carrier 2 shown in FIG. 1, are adapted to detect a transmit command, which transmit command can be generated by the communication device 1 shown in FIG. 1. In contradistinction to the second detection means 29 shown in FIG. 1, the detection means 29 of the data carrier 2 shown in FIG. 2 are adapted to supply the group data length data GDL.

The memory means 16 of the data carrier 2 shown in FIG. 2 include a first memory section 47 and a second memory section 48. In the present case, the second memory section 48 is organized similarly to the memory means 16 shown in FIG. 16, namely in sixteen memory locations S shown in FIG. 6.

The data carrier 2 further includes access enable means 49 to enable memory access, i.e. erase access, write access and read access to the memory means 16. For this purpose, the access enable means 49 are adapted to receive the first access control signal AC1 and the second access control signal AC2 from the protocol detection means 40.

The access enable means 49 are configured so as to enable access to the memory means 16 by the first operating system 41 and the second operating system 42 in such a manner that after reception of the first access control signal AC1 the first operating system 41 is enabled to access the first memory section 47 and the second memory section 48, while after reception of the second access control signal AC2 the operating system 42 is enabled to access the second memory section 48 only.

To access the first memory section 47 the first operating system 41 includes the first read means 44, the first write access means 45 and the erase means 34. The erase means 34 are of a design similar to that of the erase means 34. Thus, after detection of the write command with the aid of the first detection means 28 first address data AD1 can be supplied to the erase means 34, after which a direct erase access to the first memory section 47 or an indirect erase access to the second memory section 48 via the access enable means 47 in accordance with the first address data AD1 is possible.

After detection of a write command with the aid of the first detection means 28 the first write access means 45, similarly to the write access means 35 shown in FIG. 1, are adapted to access the first memory section 47. In contradistinction to the write access means 35 shown in FIG. 1, the first write access means 45 shown in FIG. 2 are not adapted to receive the second address data AD2 and the second write data WD2 and are, as a consequence, neither adapted to access the first memory section 47 in accordance with the second address data AD2 and the second write data WD2.

After detection of a read command with the aid of the third detection means 30 the first read means 44, similarly to the read means 31 shown in FIG. 1, are adapted to have read access to the first memory section 47. In contradistinction to the read means 31 shown in FIG. 1 the first read means 44 shown in FIG. 2 are not adapted to have provide read access in accordance with the second address data AD2.

The second read means 31, the group data test means 36 and the second write access means 35, similarly to the write means 32 of the data carrier 2 shown in FIG. 1, form the write means 32 of the data carrier 2 shown in FIG. 2. In contradistinction to the write means 32 shown in FIG. 1 the group data test means 36 shown in FIG. 2 are adapted to receive group data length data GDL.

The third address data AD3 can be applied from the third detection means 30 to second read means 31 via the access enable means 49. The read data RD can be applied from the second read means 32 to the third detection means 30 via the access enable means 49.

The first address data AD1 and the first write data WD1 can be applied from the first detection means 28 to the second write access means 35 via the access enable means 49.

The initialization means 33 shown in FIG. 1 differ from the initialization means 33 shown in FIG. 2 in that the initialization means 33 shown in FIG. 33 are formed with the aid of the erase means 34, the access enable means 49 and the second write access means 35. As a result, the data carrier 2 can initialize the second memory section 48 with the aid of the initialization means 33 after detection of the first command data CD1, i.e. the write command, with the aid of the first detection means 30. In the present case, the write data WD1 obtained after detection of the first command data CD1 include group data GD having a variable group data length. After detection of the first command data CD1 the initialization means 33 are, as a consequence, adapted to initialize the second memory section 48 of the memory means 16 in accordance with the group data GD of variable group data length included in the data D.

In the group data test means 36 the group data length data GDL, applied by the second detection means 29, and the group data GD, also applied by the second detection means 29, enable read data RD obtained with the aid of the second read means to be masked as regards the stored group data MGD included in the read data RD. The group data test means 36 are further adapted to compare the group data GD, which have a group data length characterized with the aid of the group data length data GDL, with the stored group data MGD. In the case of a match between the group data GD and the stored group data MGD the second write data WD2 can be written with the aid of the second write access means 35 during a write access to the second memory section 48. Thus, after detection of the second command data CD2 the second write means are adapted to write the information data ID into the second memory section 48 of the memory means 16, which memory section has been initialized in accordance with the group data GD of variable group data length.

Hereinafter, the operation of the data carrier 2 and the communication device 1 is explained with reference to a first example of use of the data carrier 2 in accordance with the second embodiment of the invention shown in FIG. 2 and of the communication device 1 in accordance with the first embodiment of the invention shown in FIG. 1.

In this second example of use, similarly to the first example of use, it is assumed that the data carrier 2 is used in a subway. In the second example it is also assumed that a secondary communication device is installed in the entrance area of the subway line. In the same way as in the first example of use, the first communication device 1 is installed in the exit area of the subway line. In the present case, the data carrier 2 is adapted to gather statistical data, as in the first example of use. However, in the second example of use the data carrier 2 is also utilized as an electronic ticket. In view of the use of the data carrier 2 as an electronic ticket, the data carrier 2 complies with minimum security requirements in the communication with the secondary communication device. These minimum security requirements comprise an encoded data transmission between the secondary communication device and the data carrier 2 and an authentication of an access to a memory section protected by means of keys, i.e. the first memory section 47 of the data carrier 2, during communication between the data carrier 2 and the secondary communication device. Therefore, it is assumed that the first operating system 41 is realized with the aid of an operating system put on the market by the applicant under the trade name MIFARE, which system is consequently known. It is further assumed that a transportation credit is stored in key-protected sectors of the first memory section 47. It is also assumed that the second memory section 48 serves to store the statistical data.

During passage of an entrance area of a subway line such a data carrier 2 must be brought in the direct proximity of an interface of the secondary communication device by a passenger. Once this has happened data D are transferred from the secondary communication device to the data carrier 2 with the aid of the interface 17 of the data carrier 2. The bit stream BD generated from the data D with the aid of the data conversion means 21 are applied to the protocol detection means 40, which protocol detection means 40 detect the first communication protocol and subsequently start the first operating system 41.

Subsequently, the secondary communication device ascertains that the data carrier 2 is selected as the only data carrier 2 within the communication range of the secondary communication device. After this, the access to the first memory section 47 is authenticated. After authentication, transportation units are deducted from the transportation credit in the first memory section 47.

After this, the secondary communication device generates a write command and transfers it to the data carrier 2, which write command is detected with the aid of the first detection means 28. After detection an entry time and an entry location are written as write data WD1 into a second memory location SP2 of the second memory section 48, which memory location is addressed with the aid of the first address data AD1.

The secondary communication device further generates a write command to initialize a first memory location SP1 of the second memory section 48 in accordance with group data GD of variable group data length and transfers this to the data carrier 2, which write command is detected with the aid of first detection means 28. The first write command is then transferred to the data carrier 2 as a stream of first data D as shown in FIG. 3. The command data CD1 include first address data AD1 for addressing the first memory location SP1 of the second memory section 48. The information data ID include group data GD having a group data length characterized by the group data length data GDL. The information data ID further include dummy data ED. In response to the first address data AD1 the initialization means 33 are activated and the first memory location SP1 of the second memory section 48 of the memory means 16 is initialized to store the information data ID in accordance with the group data GD of variable group data length included in the stream of first data D. During this initialization an erase access to the second memory section 48 in accordance with the first address data AD1 takes place with the aid of the erase means 34. Subsequently, the first write data WD1, i.e. the information data ID, which include the group data GD and the dummy data ED, are written into the first memory location SP1 of the second memory section 48 of the memory means 16 with the aid of the second write access means 35 in accordance with the first address data AD1, by which said memory location is addressed. It is to be noted that during the initialization of the second memory section 48 it is also possible to perform a read-after-write check by means of a read command that can be generated in the secondary communication device. After the initialization of the second memory location of the second memory section 48 the data carrier 2 is moved out of the communication range of the secondary communication device by the passenger.

In the exit area of the subway line the passenger carrying the data carrier 2 thus initialized passes through the communication range of the communication device 1 shown in FIG. 1. The communication device 1 continuously supplies the transmit command. As soon as the data carrier 2 enters this communication range the interface 17 receives the stream of second data D as shown in FIG. 4 and this stream is transferred as a bit stream to the protocol detection means 40. Thereupon, the protocol detection means 40 detect the second communication protocol and start the second operating system 42. The second detection means 29 detect the second command data CD2 and supply the second address data AD2, the group data length data GDL, the group data GD and the second write data WD2 to the write means 32, which second write data WD2 represent the exit location and the exit time. Now the group data GD of variable group data length are verified in the write means 32 with the aid of stored group data MGD addressed by means of the second address data AD2 and read out with the aid of the first read means 31. In the case of a match between the group data GD and the stored group data MGD the information data ID including the second write data WD2 are written into first memory location SP1 of the second memory section 48 of the memory means 16 after detection of the second command data CD2 with the aid of the second detection means 29, which memory location has been initialized in accordance with the group data GD of variable group data length.

The statistical data thus stored can be read from the data carrier 2, for example, after a subsequent entry into an entrance area of a subway line during the communication between the secondary communication device and the data carrier 2 with the aid of a read command that can be generated in the secondary communication device after detection of this read command with the aid of the third detection means 30 and addressing of a corresponding memory location of the second memory section 48 of the read means 16 in accordance with the third address data AD3 during a read access to the second memory section 48 by the read means 31.

In connection with the group data GD of variable group data length it is to be emphasized that different data carriers 2 as shown in FIG. 2 may be issued by different service providers, such as for example an operator of a subway line or an operator of a ski lift or an operator of an airport. If a passenger now carries data carriers 2 issued by different service providers, all these data carriers will be activated during passage through an exit area, be it the exit area of a subway, a ski lift or an airport, and will simultaneously receive the transmit command. However, the second operating systems 42 of the data carriers 2 will execute the transmit command for only one data carrier 2, which data carrier 2 has a second memory section 2 initialized in accordance with the appropriate group data GD of variable group data length. This has the advantage that an unambiguous selection of a data carrier 2 in accordance with the group data GD is possible even in the case of a plurality of data carriers 2 from different service providers.

What is claimed is:

1. A data carrier (2) having an electrical circuit (18) which includes data conversion means (21), operating clock generator (22), and an operating voltage generator (23) of at least one interface (17), which are adapted to receive data (D), which data (D) include command data (CD1, CD2) and information data (ID), and which includes memory means (16) adapted to store the information (ID), and which includes first detection means (28) adapted for unidirectional communication to detect first command data (CD1) from a communication device, and which includes initialization means (33) adapted to initialize, after detection of the first command data (CD1), the memory means (16) for the storage of information data (ID), and which includes write means (32) adapted to write, after initialization of the memory means (16), the information data (ID) into the initialized memory means (16), wherein second detection means (29) are included, which second detection means are adapted to detect second command data (CD2), and the write means are adapted to write the information data (ID) into the initialized memory means (16) after detection of the second command data (CD2), without performing a read-after-write check and signaling the communication device that said read-after-write check was successful.

2. A data carrier (2) as claimed in claim 1, characterized in that after detection of the first command data (CD1) the initialization means (33) are adapted to initialize the memory means (16) in accordance with group data (GD) included in the data (D), and after detection of the second command data (CD2) the write means (32) are adapted to write the information data (ID) into the memory means (16) initialized in accordance with the group data (GD).

3. A data carrier (2) as claimed in claim 2, characterized in that after detection of the first command data (CD1) the initialization means (33) are adapted to initialize the memory means (16) in accordance with group data (GD) of variable group data length included in the data (D), and after detection of the second command data (CD2) the write means (32) are adapted to write the information data (ID) into the memory means (16) initialized in accordance with the group data (GD) of variable group data length.

4. A circuit (18) for a data carrier (2) which includes data conversion means (21), an operating clock generator (22), and an operating voltage generator (23) adapted to receive data of at least one interface (17), which data (D) include command data (CD1, CD2) and information data (ID), and which includes memory means (16) adapted to store the information data (ID), and which includes first detection means (28) adapted for unidirectional communication to detect first command data (CD1) from a communication device, and which includes initialization means (33) adapted to initialize, after detection of the first command data (CD1), the memory means (16) for the storage of information data (ID), and which includes write means (32) adapted to write, after initialization of the memory means (16), the information data (ID) into the initialized memory means (16), characterized in that second detection means (29) are included, which second detection means are adapted to detect second command data (CD2), and the write means (32) are adapted to write the information data (ID) into the initialized memory means (16) after detection of the second command data (CD2), without performing a read-after-write check and signaling the communication device that said read-after-write check was successful.

5. A circuit (18) as claimed in claim 4, characterized in that after detection of the first command data (CD1) the initialization means (33) are adapted to initialize the memory means (16) in accordance with group data (GD) included in the data (D), and after detection of the second command data (CD2) the write means (32) are adapted to write the information data (ID) into the memory means (16) initialized in accordance with the group data (GD).

6. A circuit (18) as claimed in claim 5, characterized in that after detection of the first command data (CD1) the initialization means (33) are adapted to initialize the memory means (16) in accordance with group data (GD) of variable group data length included in the data (D), and after detection of the second command data (CD2) the write means (32) are adapted to write the information data (ID) into the memory means (16) initialized in accordance with the group data (GD) of variable group data length.

7. A communication device (1) which is adapted to transfer data (D) unidirectionally to a data carrier (2), which data (D) include command data (CD1, CD2) and information data (ID), and which includes a first command generator (6) adapted to generate first command data (CD1) which can be transferred to the data carrier (2) and which can be detected with the aid of the data carrier (2), as a result of which in the data carrier (2), after detection of the first command data (CD1), memory means (16) of the data carrier (2) can be initialized for the storage of information data (ID) and as a result of which in the data carrier (2), after initialization of the memory means (16), the information data (ID) can be written into the initialized memory means 916), without performing a read-after-write check and signaling that said read-after-write check was successful, wherein a second command generator (7) is included, which second command generator is adapted to generate second command data (CD2) which can be transferred to the data carrier (2) and which can be detected with the aid of the data carrier (2), so as to enable the information data (ID) to be written into the initialized memory means (16) in the data carrier (2) after detection of the second command data (CD2).

8. A communication device (1) as claimed in claim 7, characterized in that a group data generator (10) is included, which group data generator (10) is adapted to generate group data (GD) which can be transferred by the data carrier (2)

and which can be evaluated with the aid of the data carrier (2), as a result of which in the data carrier (2) the memory means (16) can be initialized and as a result of which in the data carrier (2), after detection of the second command data (CD2), the information data (ID) can be written into the memory means (16) initialized in accordance with the group data (GD).

9. A communication device (1) as claimed in claim 8, characterized in that the group data generator (10) is adapted to generate group data (GD) of variable group data length which can be transferred to the data carrier (2) and which can be evaluated with the aid of the data carrier (2), as a result of which in the data carrier (2) the memory means (16) can be initialized in accordance with the group data (GD) of variable group data length and as a result of which in the data carrier (2), after detection of the second command data (CD2), the information data (ID) can be written into the memory means (16) initialized in accordance with the group data (GD) of variable group data length.

10. A method of storing data (D) in memory means (16) of a data carrier (2), the method comprising the steps of:
receiving the data (D), which data (D) include command data (CD1, CD2) and information data (ID) that was sent in a unidirectional communication from a communication device, and
detecting first command data (CD1), and
initializing the memory means (16) for the storage of the information data (ID) after detection of the first command data (CD1), and
storing the information data (ID) in the memory means (16) after initialization of the memory means (16), characterized in that
second command data (CD2) are detected, and after detection of the second command data (CD2) the information data (ID) are written into the initialized memory means (16), without performing a read-after-write check and signaling the communication device that said read-after-write check was successful.

11. A method as claimed in claim 10, characterized in that
the initialization of the memory means (16) for the storage of the information data (ID) is effected after detection of the first command data (CD1) in accordance with the group data (GD) included in the data (D), and after detection of the second command data (CD2) the information data (ID) are written into the memory means (16) initialized in accordance with the group data (GD).

12. A method as claimed in claim 11, characterized in that
the initialization of the memory means (16) for the storage of the information data (ID) is effected after detection of the first command data (CD1) in accordance with the group data (GD) of variable group data length included in the data (D), and essentially immediately after detection of the second command data (CD2) the information data (ID) are written into the memory means (16) initialized in accordance with the group data (GD) of variable group length.

* * * * *